United States Patent Office 2,777,205
Patented Jan. 15, 1957

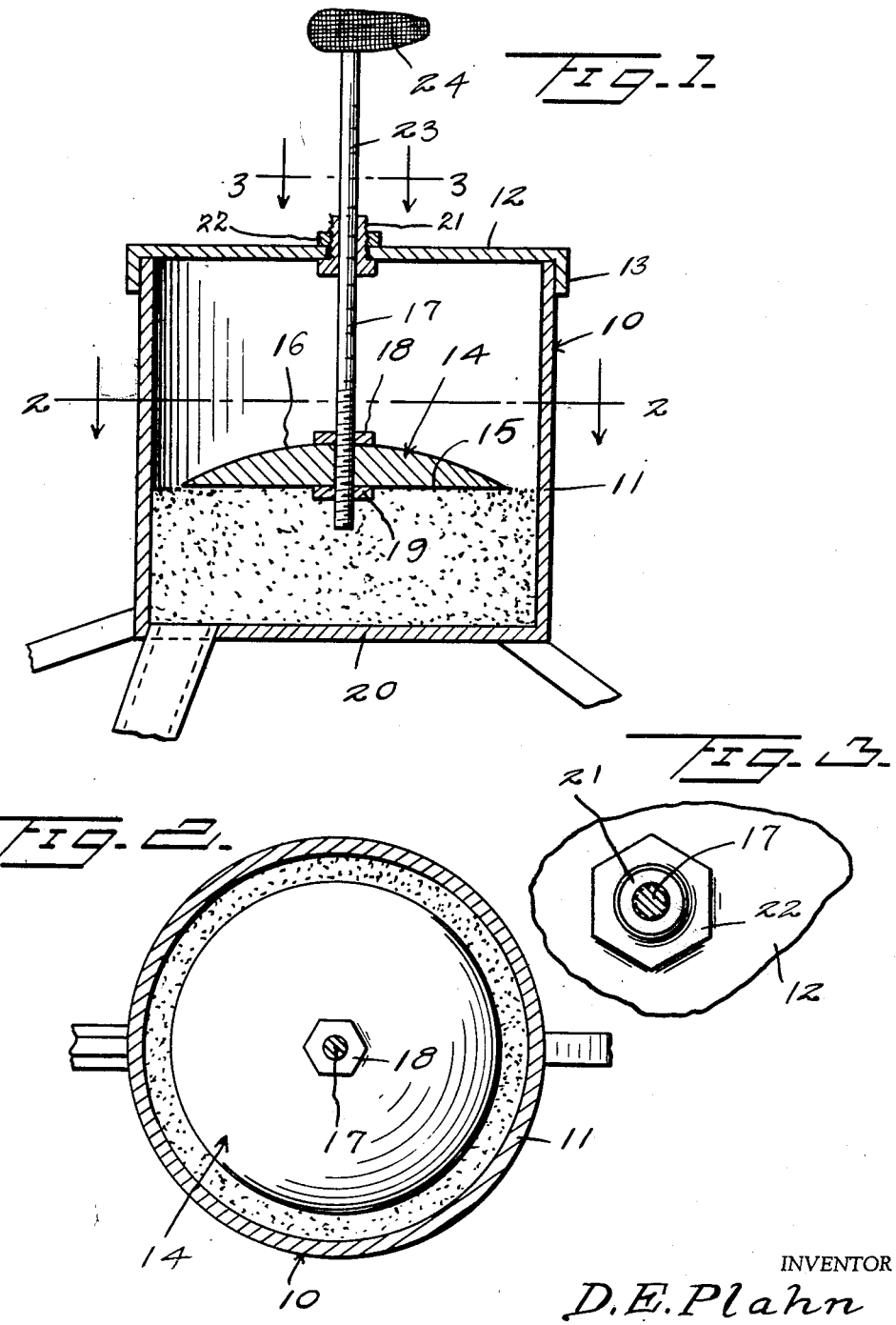

2,777,205

CORN PLANTER BOX GAUGE

Donald E. Plahn, Garretson, S. Dak., assignor of one-third to Leslie E. Johnson, Garretson, S. Dak.

Application September 21, 1953, Serial No. 381,240

1 Claim. (Cl. 33—126)

This invention relates to a gauge for use with a corn planter.

In a corn planter there is provided a hopper in which the corn is fed to the shoe or plow. It is, therefore, an object of this invention to provide, in combination with a hopper for corn planters, a gauge which will show at all times the quantity of corn remaining in the hopper. In this manner it will not be necessary for the operator to frequently stop the device to examine the hopper in order to see how much corn remains.

Another object of this invention is to provide a gauge attachment which can be mounted on various kinds and types of planters.

A further object of this invention is to provide a gauge of this kind which is simple in construction and positive in action so that the quantity of corn or other seed in the planter can be determined without removing the cover for the hopper.

With the above and further objects in view, my invention consists in the arrangement, combination and details of construction disclosed in the drawing and specification and then more particularly pointed out in the appended claim.

Referring to the drawing:

Figure 1 is a vertical section partly broken away of a seed planter having a gauge constructed according to an embodiment of this invention mounted therein.

Figure 2 is a sectional view taken on the line 2—2 of Figure 1.

Figure 3 is a sectional view taken on the line 3—3 of Figure 1.

Referring to the drawing, the numeral 10 designates generally a conventional corn seed planter. The planter 10 includes a cylindrical hopper 11 having a lid or cover 12 on the upper end thereof formed with a dependent marginal flange 13.

In order to provide a means whereby the operator may be able to determine at a glance the quantity of corn remaining in the hopper 11, I have provided a gauge structure which includes a disc-shaped plate 14. The plate 14 is slightly less in diameter than the diameter of the inside of hopper 11 and the plate 14 is formed with a flat lower side 15 and a convex upper side 16. The convex upper side of the plate 14 is provided so that any kernel of corn which may engage on the upper side of plate 14 may readily slide downwardly over the convex upper side of plate 14 and mingle with the corn below plate 14 at the marginal edge of plate 14.

A vertically disposed bar 17 is secured to plate 14 by means of upper and lower nuts 18 and 19 respectively, and as shown in Figure 1, the bar 17 projects downwardly below the lower surface 15 of plate 14 so that when plate 14 is in its lowermost position the lower end of bar 17 will hold plate 14 against contact with the bottom wall 20 of hopper 11. Bar 17 slidably engages through a sleeve or bushing 21 which extends through the center of lid 12 and sleeve 21 is tightly secured in lid 12 by means of a nut 22.

The surface of bar 17 may be provided with graduations 23 so that the operator of the planter can determine at a glance of bar 17 the amount of corn still remaining in the hopper 11. The upper end of bar 17 has a handle 24 secured thereto, and in the present instance, handle 24 is constructed in a form to simulate an ear of corn.

Handle 24 co-acts with plate 14 in providing the necessary weight so that follower plate 14 may be readily moved downwardly in hopper 11 as the corn is withdrawn therefrom in the planting operation.

In the use and operation of this gauge structure, the lid 12 is formed with a central opening within which sleeve 21 is secured. The hopper 11 may be substantially filled with corn which is to be planted by the corn planter, whereupon lid 12 is put back in place. With hopper 11 substantially filled with corn, plate 14 will be at its uppermost position, and as the corn is withdrawn, plate 14 which rides on the upper surfce of the corn will move downwardly and the graduations 23 will indicate the remaining quantity of corn in the hopper 11.

When the lower end of bar 17 contacts with the bottom wall 20 of hopper 11 there will still be a small quantity of corn which remains to be withdrawn from the hopper. In this manner, when the gauge bar 17 indicates that the hopper is substantially empty, there still remains a small quantity of corn which will permit movement of the planter for one or more full or fractional rows of corn to be planted.

What is claimed is:

In a corn planter having a hopper and a lid on the upper end thereof, a gauge attachment comprising a weighted follower plate loosely engageable in said hopper, said plate having a flat lower surface and a convex upper surface, a tubular guide secured centrally of said lid, a rod fixed to said plate and slidably engaging through said guide, said rod being axially calibrated and the lower end thereof projecting below said plate whereby in the lowermost position of said plate the lower end of said rod will hold said plate above the bottom of the hopper, and a handle fixed to the upper end of said rod.

References Cited in the file of this patent

UNITED STATES PATENTS

| | | |
|---|---|---|
| 1,323,812 | Baruch | Dec. 2, 1919 |
| 1,391,504 | Renkin | Sept. 20, 1921 |
| 1,465,351 | Dixon | Aug. 21, 1923 |
| 1,573,310 | Foulds | Feb. 16, 1926 |
| 1,939,368 | Rydmark | Dec. 12, 1933 |
| 2,449,915 | Stalder | Sept. 21, 1948 |